United States Patent [19]

Petzold et al.

[11] Patent Number: 4,986,401
[45] Date of Patent: Jan. 22, 1991

[54] DEVICE FOR CONTROLLING AN AUTOMATIC MOTOR-VEHICLE CLUTCH

[75] Inventors: Rainer Petzold, Friedrichshafen; Norbert Wiencek, Hagnau, both of Fed. Rep. of Germany

[73] Assignee: Zahnradfabrik Friedrichshaften AG, Friedrichshafen, Fed. Rep. of Germany

[21] Appl. No.: 411,482

[22] PCT Filed: Mar. 18, 1988

[86] PCT No.: PCT/EP88/00219
§ 371 Date: Sep. 21, 1989
§ 102(e) Date: Sep. 21, 1989

[87] PCT Pub. No.: WO88/07457
PCT Pub. Date: Oct. 6, 1988

[30] Foreign Application Priority Data

Mar. 26, 1987 [DE] Fed. Rep. of Germany ....... 3710015

[51] Int. Cl.$^5$ ............................................. F16D 43/22
[52] U.S. Cl. ..................................... 192/0.032; 192/76
[58] Field of Search ................. 192/32, 76, 96, 30 V, 192/103 F

[56] References Cited

U.S. PATENT DOCUMENTS

| | | | |
|---|---|---|---|
| 4,457,411 | 7/1984 | Hiramatsu | 192/76 |
| 4,468,988 | 9/1984 | Hiramatsu | 192/103 R |
| 4,582,185 | 4/1986 | Grimes et al. | 192/3.31 |
| 4,677,787 | 5/1987 | Hofmann | 192/32 |
| 4,785,917 | 11/1988 | Tateno et al. | 192/76 |
| 4,854,433 | 8/1989 | Tellert | 192/76 |

FOREIGN PATENT DOCUMENTS

| | | |
|---|---|---|
| 3531434 | 3/1987 | Fed. Rep. of Germany . |
| 2483649 | 4/1981 | France . |
| 2559106 | 9/1985 | France . |
| 4531094 | 2/1986 | Japan . |
| 2080910 | 2/1982 | United Kingdom .......... 192/32 |
| 2088007 | 6/1982 | United Kingdom .......... 192/32 |

Primary Examiner—Dwight Diehl
Assistant Examiner—Andrea Pitts
Attorney, Agent, or Firm—Herbert Dubno

[57] ABSTRACT

A device for controlling an automatic motor vehicle clutch is arranged between a driving enging and a transmission. This clutch operates primarily as a starting clutch and the engine torque TM and the rotational speeds before and after the clutch nM, nGE are detected or measured. A control device transforms an electric signal coming from an electronic control unit into a control value for the regulating device for the opening and closing of the clutch from the frequency and the amplitude of the engine speed and/or the transmission input speed, unacceptable vibrations (S) in the drive train betweeen the engine, clutch and transmission are detected and eliminated through a predetermined opening of the clutch. This opening takes place up to a path mark which is derived from a characteristic curve stored in an electronic control unit. For this purpose, during each starting process, in the reversal point UP of the rotational speed of the engine nM the corresponding engine torque TM and path marks WM from the coupling path are stored and the characteristic curve is computed and continuously renewed through running measurements and is improved as a result of the frequent measurements.

10 Claims, 2 Drawing Sheets

DEVICE FOR CONTROLLING AN AUTOMATIC MOTOR-VEHICLE CLUTCH

CROSS REFERENCE TO RELATED APPLICATIONS

This application is a national phase application of PCT/EP88/00219 field Mar. 18, 1988 and based upon a German Application P 37 10 015.7 filed Mar. 26, 1987.

FIELD OF THE INVENTION

This invention relates to a device for controlling an automatic motor-vehicle clutch arranged between a driving engine and a transmission and operating primarily as a starting clutch, an engine torque and rotational speeds are detected before and after the clutch, the speeds are measured by a control device transforming an electric signal coming therefrom into a control valve for a regulating device opening the clutch so that the clutch is actuated for starting and shifting and actuates torsional vibrations in drive train.

BACKGROUND OF THE INVENTION

From the not yet published PCT/EP86/00544, a device for controlling an automatic motor-vehicle clutch is known. With this device, an initial engagement speed which is well adjusted to the starting resistance becomes rapidly effective and it is possible to achieve not only a rapid but also a qualitatively good starting process by means of correction factors and influencing mechanisms.

In order to achieve the most economic fuel-consumption values, modern automatic transmissions have drive cycles with relatively low shift points, so that, in the case of a low engine rotation, vibrations can occur. While in an automatic transmission preceded by a hydrodynamic torque converter these vibrations cannot be passed, they are easily transmitted to the transmission in an automatic clutch-transmission combination, in spite of mechanically-acting dampers provided in such clutches against torsional vibrations.

As is known from FR-A 2 559 106 a device for the automatic adjustment of clutch attenuates torsional vibrations in the drive train through controlled changes in the clutch torque. However, the detection of these vibrations and defining the correction factors are complicated and expensive, requiring, besides considerable computing efforts and thus time consumption, as well as the consideration of characteristic values which have to be first determined and then fed into the memory. These characteristic values, for instance, the torsional rigidity in the respective gear, can vary between the respective drive trains, so that, in addition to the high cost, the read conditions in the drive train are not even fully considered. From JP-A-60/19 18 28, a device with a manually actuated clutch is known. Vibrations occurring in the drive train after the transmission are measured via a tacho-generator and are eliminated over a half-opened clutch. The clutch actuation for the half-opening takes place hereby via a control mechanism with a soleniud valve, which is superimposed on the manually driven actuation cylinder serving for the clutch actuation in order to eliminate the vibrations. Such a clutch-influencing mechanism can no longer be used in a modern drive train.

Further, from a control of a clutch travel according to German Open Application 3 531 434, it is known to adjust a clutch in such a way that a sliding torque transmittal by the clutch is equal or only slightly bigger than the torque transmitted after engine side. However this adjustment takes place in connection with rotation-speed differences before and after the clutch as a result of excessive loads.

OBJECTS OF THE INVENTION

It is therefore the object of the invention to develop a device for controlling a clutch travel of an automatic motor-vehicle clutch which eliminates and prevents unacceptable vibrations in the drive train including an engine. Yet another object is to develop a method for controlling the clutch travel in order to prevent unacceptable vibration of the drive train.

SUMMARY OF THE INVENTION

In accordance with the invention the device for controlling an automatic motor vehicle clutch is arranged between a driving engine and a transmission, an engine torque and a transmission torque are detected by a control device transferring an electrical signal coming from an electronic control unit into a control value for the regulating device opening and closing the clutch and, by doing so, attentuating torsional vibrations in a drive train upon measuring the frequency and amplitude of the rotational speed of the engine shaft and/or of the input shaft of the transmission and speed corresponding to equal torques of the engine and transmission input shafts.

As a result of the predetermined opening of the clutch upon detecting at the vibrations passed on the number of engine rotations, the torque peaks are converted into friction and therefore are not transformed to the transmission.

In a relatively simple way, it is possible to detect the reversal point of the engine speed, when the engine torque and the torque transmissible through the clutch are equal. If the clutch is opened at a predetermined path corresponding yo yhr inflation point, and only the engine torque in the clutch is further transmitted to the transmission so that the vibrations are eliminated without transmission losses, because only the torque peaks are converted into friction.

For particularly vibration-prone drive trains, when, for instance, the engine runs primarily at very low speeds, it is also possible to engage the clutch only at the predetermined path where the engine torque and the torque transmissible through the clutch are equal. Each nascent vibration is immediately converted to friction in the clutch, so that the vibrations do not even reach the inadmissible level. Thereby, it could be feasible to detect the paths to be stored for the reversal point by considering a correction factor in order to control the clutch travel. This way, substantial transmission losses can be avoided. The correction factor can be constant or can be, for instance, torque-dependent.

The invention is not limited to the combination of the features defined in the claims. For the one skilled in the art, further combination possibilities arise from the method and device as claimed and described.

BRIEF DESCRIPTION OF THE DRAWING

The above and further features and advantages will become readily apparent from the following references being made to the following drawing.

SPECIFIC DESCRIPTION

Figure 1:
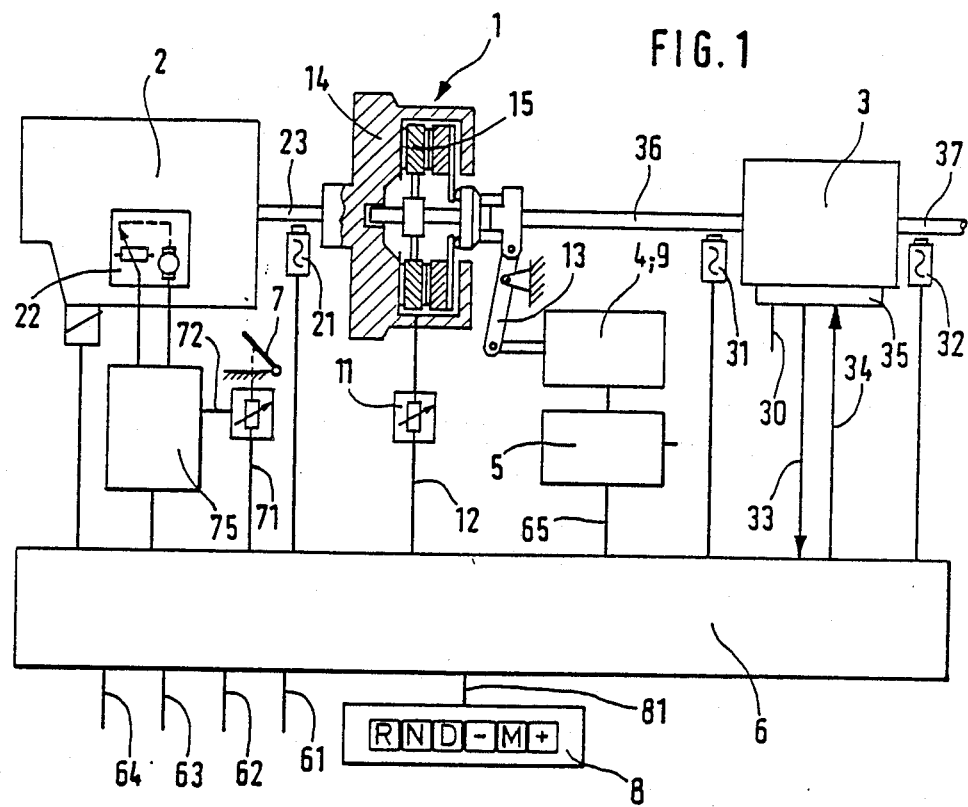
FIG. 1 is a block diagram of a drive train in connection with an automatic clutch.

In FIG. 1, the automatic clutch can be, for instance, a dry clutch which is opened via springs and is closed via a regulating device 4. The clutch 1 is arranged in the drive train 2, 1, 3 between the engine 2 and a transmission 3, e.g. an automatic and synchronized variable transmission. Rotational speed sensors 21, 31 32 detect the rotational speed of the engine nM, the input speed of the transmission nGE and the output speed of the transmission nab and are located, for instance, on the engine output shaft 23, the transmission input shaft 36 and on the transmission output shaft 37. The electronic control unit 6, consisting of an input unit, an output unit and one or more memories and microprocessors is not shown in detail.

The unit received information via a circuit 81 from a controller 8 which has, for instance, a neutral position N, a reverse-drive position R, a forward-drive position D and a switch for manual drive M. With the buttons Minus and Plus, during each actuation in connection with the button M, high- and reverse shifting can be done via one gear. Further information is received by the electronic unit 6 via the position of the foot brake through a circuit 61, the hand brake through a circuit 62, the kick-down switching means of a circuit 63, as well as via the engine-brake actuator through a circuit 64. The path of the clutch 1 is established through an odometer 11 and is also fed to the electronic control unit 6 as information, via a circuit 12. The transmission 3 also has a switch-valve block 35 which receives orders from the electronic control unit 6 via the circuit 34, whereby a sign corresponding to the respective gear position is fed back to the electronic control unit via a circuit 33. An auxiliary force, e.g. an air or hydraulic fluid is detected via the pipe 30 to the switch valve 35 for the shifting of gears.

Figure 2:
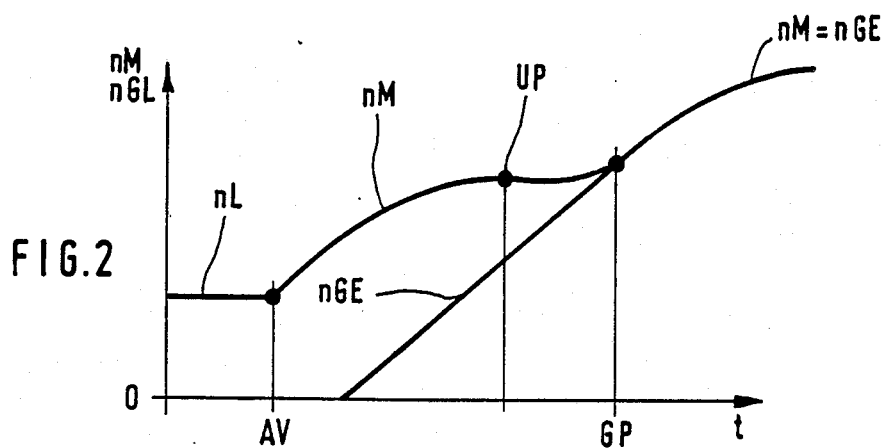
FIG. 2 is an engine and transmission input speed curve in a starting process, in relation to time.

FIG. 2 shows the characteristic curve of the rotational speed nM of the engine and the curve of the input speed nGE of the transmission in a starting process in relation to time t. nL is the idling speed of the driving engine 2 and GP is the point where the clutch is fully closed.

Figure 3:
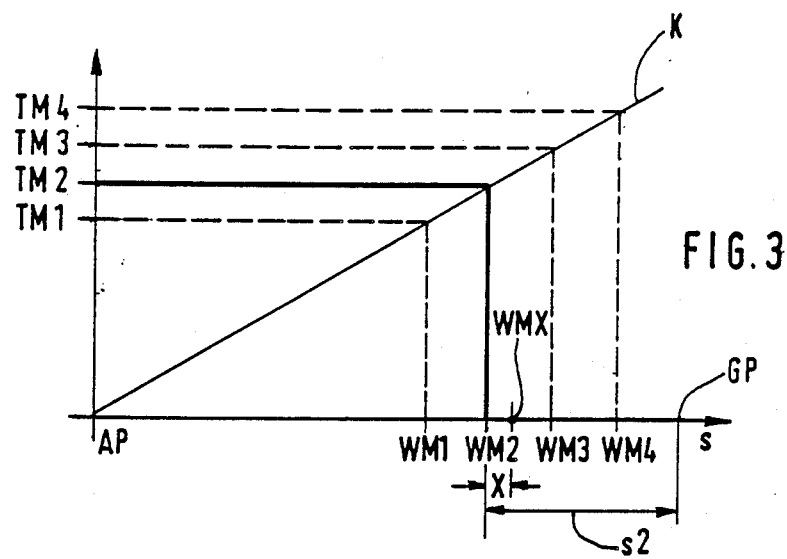
FIG. 3 is a characteristic curve of the transmissible torque in dependence on the path of the clutch.
Figure 4:
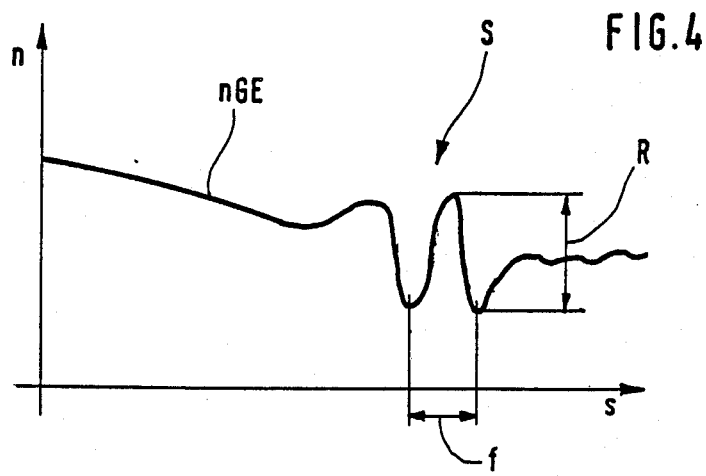
FIG. 4 is a rotational speed curve with a vibration.

FIG. 3 shows a characteristic curve K resulting from a multitude of measured path points WM 1 to 3 of the clutch 1, with the corresponding thereto torques TM 1 to 3 and is stored in the electronic control unit 6. The path points WM 1 to 3 of the clutch 1, lying between the point Ap and point GP when the clutch is fully closed, are always measured at the point when the engine torque TM and the moment TGE transmitted by the clutch and introduced in the transmission 3 are equal. This is the curve-direction- reversal or inflection point UP of the engine speed nM at each start.

The rotational-speed curve nGE of the transmission input shaft 36 is related to time s. In a relatively low rotational-speed range, a vibration S can develop and can be recognized as inadmissible due to its own frequency f and the amplitude R. Minimal vibrations with low frequency and a small amplitude are almost always present, but are not significant and can be appreciated.

The predetermined opening of the clutch 1 is detected at each start. With the actuation of the gas pedal 7, the rotational speed nM of the engine increases, from the idling speed nL in a more or less steeper way, depending on the position of the gas pedal, and the clutch 1 starts closing.

After a short while, the clutch half 15 connected to the transmission 3 is entrained. While the rotational speed of the transmission input-shaft nGE increases relatively rapidly, the increase of the rotational speed nM of the engine and thereby of the clutch half 14 connected to the engine is reduced. At the reversal point UP, i.e. at the point where the rotational speed nM of the engine does no longer increase until the full engagement of the clutch occurs, the engine torque TM is equal to the torque TGE which is transmitted by the clutch 3. This point is easily detected. The path assigned to this reversal point UP, e.g. WM 2, which is detected by the odometer 11, is now stored in the electronic control unit. At the same time, the engine torque at this point of time is TM 2, which for instance, is empirically based on the electronic gas actuation 75 and is stored. From a multitude of starting processes and thereby from the path points WM 1 to 3 and the engine torques TM 1 to 3 corresponding thereto, a characteristic line K is computed and stored in the electronic unit, so that by starting with an engine torque TM 4 which has not been previously established through the reversal point UP, a path WM 4 can be assigned. As a result of the continuous measurements and storage of the torques TM and path points WM pertaining to the reversal point UP in each starting process, the characteristic line becomes more and more actual and an occurring clutch wear has no negative influence.

If during the measurement of, for instance, the rotational engine speed nM, which at the end of the starting process is also the transmission input rotational speed nGE, inadmissible vibrations S are found, the clutch 1 is immediately opened to the path mark WM 2 corresponding to the respective torque, e.g. TM 2 established through the characteristic curve K and coresponding to the path S 2. In this case, only the engine torque TM 2 is transmitted by the clutch 3 and the torque peaks from the vibrations S are converted into friction. Thereby, the transmission input speed nGE varies slightly from the rotational speed of the engine nM.

The renewed closing of the clutch 1 via the path S 2 up to the point GP takes place depending from the position of the gas pedal 7, whereby the closing speed is also established via this dependence. Instead of the gas pedal, the change in the engine torque and/or the change in the rotational speed of the engine can induce the closing process and determine the closing speed.

In the case of particularly vibration-prone drive engines 2, it can be suitable to generally close the coupling only to the slippage limit, thus only to the reversal point UP of the engine speed nM and thus only to the corresponding path mark WM. In this way, all inadmissible vibrations coming from the engine are attenuated or eliminated in the clutch 1, due to friction. Through a constant or engine torque TM dependent correction factor X added to the path mark WM, the closing position XWM of the clutch can be brought within a safe range for the torque transmission. When a low continuous slippage is provided, the correction factor X can also be deducted from the path mark WM. The setting of the respective path marks WM 1 to 4, WMX established by the electronic control unit 6 takes place via the control device 5, the adjusting device or the servomotor 9, and the clutch lever 13.

The invention is not limited to the controlling device described in the illustrated embodiment, for instance, the clutch 1 can be actuated via a pressure piston. In such a clutch, at the reversal point UP of the engine speed a pressure mark can be stored. The stored characteristic line in this case engine would correspond to torques TM and over respective marks.

What is claimed is:

1. A device for controlling an automatic motor vehicle clutch having one side connected to an engine shaft driven by an engine and another side connected to an input shaft to a transmission, said shafts forming with said clutch a drive train transmitting an engine torque, said device comprising:
    an electronic control unit storing a relationship between clutch position and torque transmitted through said train;
    means for detecting an engine torque and rotational of said engine shaft; and
    means responsive to at least one of a frequency and amplitude of a rotational speed of said engine shaft and a rotational input speed of said input shaft for effecting operation of a clutch control device connected to said control unit for opening said clutch in accordance with said relationship and to attenuate vibrations in said train.

2. The device according to claim 1, wherein during each starting process a reversal point of the engine speed is measured and the engine torque and path of the clutch associated with the respective reversal point are stored in the electronic control unit.

3. The device according to claim 1, wherein, upon from a multitude of stored paths of said clutch and engine torques, in the electronic control unit a characteristic line K is stored in said control unit, said line is constantly renewed a result of the frequency of these measurements, is constantly renewed.

4. The device according to claim 1 wherein, upon detection of an unacceptable vibration the clutch is opened for a short time up to a path associated with the engine torque corresponding to said reversal point.

5. The device according to claim 1, wherein said clutch opens at a path thereof corresponding to said reversal point.

6. The device according to claim 5, wherein the clutch closes in response to a position of a gas pedal.

7. The device according to claim 5, wherein said clutch closes in response to the changes in the engine torque.

8. The device according to claim 2, wherein said clutch closes at the respective path associated with the engine torque present at the moment of said reversal point and corrected by a correction factor wherein said factor can be constant or vary according to the engine torque.

9. A vehicle comprising an engine provided with an engine shaft, a transmission provided with an input shaft, a friction clutch arranged in a torque transmission path between said engine and input shafts and a device for controlling said clutch, said device comprising:
    means for measuring a rotational speed of an engine shaft and of an input shaft of a transmission and for producing signal corresponding to said speeds, said engine and input shafts forming a drive train;
    means for continuously detecting a path of a clutch travel upon transmitting a torque from the engine to the transmission through said clutch and producing another signal corresponding to said path;
    means for regulating said clutch travel between an engaged position of and a disengaged position of said clutch; and
    electronic control means receiving said signals from said means measuring and from said detecting means and storing said signal for attenuating inadmissible vibrations in said drive train, said vibrations being detected through a frequency and amplitude of said rotational speed of said drive train, said control means detecting a reversal point of said speed of said engine shaft and being connected with said means for regulating, a torque transmitted by said engine shaft being equal to a torque transmitted through said input shaft at a predetermined path of said clutch travel between said positions upon reaching said reversal point, said clutch being open at said predetermined path by said regulating means upon detecting said reversal point.

10. A method for controlling an automatic motor vehicle clutch, said method comprising the steps of:
    measuring a rotational speed of an engine shaft, an input shaft of a transmission and producing signals corresponding thereto, said engine and input shafts forming a drivetrain;
    continuously detecting a path of a clutch travel upon transmitting a torque through a frictional clutch arranged between said engine and said transmission and producing corresponding signals;
    storing said signals and detecting a reversal point of the rotational speed of said engine shaft corresponding to a torque transmitted therethrough, said torque through said engine shaft being equal to a torque transmitted through said input shaft upon reaching said reversal point corresponding to a predetermined path of a clutch travel; and
    regulating said torque transmitted through said drive train by opening said clutch at said predetermined path corresponding to said reversal point of said rotational speed of the drive train having a minimal frequency and amplitude thereof and preventing thereby inadmissible vibrations in said drivetrain.

* * * * *